United States Patent [19]
Chang

[11] Patent Number: 6,145,209
[45] Date of Patent: Nov. 14, 2000

[54] ILLUMINATING DEVICE FOR A MAGNETIC COMPASS

[76] Inventor: Gin-Sung Chang, No. 229-21, Kuang-Ming Rd., Chien-Chu Tsun, Wu-Jin Hsiang, Taichung Hsien, Taiwan

[21] Appl. No.: 09/236,941

[22] Filed: Jan. 25, 1999

[51] Int. Cl.[7] .............................. F21L 4/00; F21V 33/00; G01C 17/20

[52] U.S. Cl. ......................... 33/348; 33/355 R; 362/190; 362/196; 362/253

[58] Field of Search ................................ 33/355 R, 348, 33/352, 349, 351, 354, 364, 272, 319, 316, 348.2; D10/68; 362/190, 191, 196, 200, 201, 253

[56] References Cited

U.S. PATENT DOCUMENTS

| | | | |
|---|---|---|---|
| D. 411,121 | 6/1999 | Chang | D10/68 |
| 2,803,068 | 8/1957 | Mason | 33/348 |
| 3,256,428 | 6/1966 | Schwartz | 362/196 |
| 4,899,453 | 2/1990 | Bhat et al. | 33/348 |
| 5,469,345 | 11/1995 | Pettersen et al. | 362/188 |

FOREIGN PATENT DOCUMENTS

| | | | |
|---|---|---|---|
| 1219080 | 3/1986 | U.S.S.R. | 33/355 R |
| 883839 | 12/1961 | United Kingdom | 33/355 R |

*Primary Examiner*—Andrew H. Hirshfeld
*Assistant Examiner*—R. Alexander Smith
*Attorney, Agent, or Firm*—Ladas & Parry

[57] ABSTRACT

An illuminating device includes a mounting plate adapted to be mounted on a bottom of a magnetic compass in a first direction. The mounting plate has a central axial hole passing therethrough in a second direction transverse to the first direction and defining a central axis, and a battery receiving chamber for receiving a battery. A lighting member is disposed on the mounting plate, and has a first lead electrically connected to a first pole of the battery. First and second conductive members are connected respectively to a second lead of the lighting member and a second pole of the battery, extend above the central axial hole, and are spaced apart from each other along the central axis. A cover plate is disposed on the mounting plate for closing the chamber, and is rotatable relative to the mounting plate about the central axis between locked and unlocked positions. An elastomeric activating member is disposed in a central through hole of the cover plate, and has an actuating portion to be depressed manually and a depression portion extending from the actuating portion upwardly through the axial hole to activate electric contact between the first and second conductive members so as to energize the lighting member with the battery when the actuating portion is depressed.

5 Claims, 5 Drawing Sheets

ILLUMINATING DEVICE FOR A MAGNETIC COMPASS

BACKGROUND OF THE INVENTION

1. Field of the Invention

This invention relates to an illuminating device, more particularly to an illuminating device adapted to be mounted on a transparent bottom of a magnetic compass for illuminating a compass rose and a compass needle thereof.

2. Description of the Related Art

A conventional magnetic compass is generally used to locate a reference direction. It is desirable to provide an illuminating device for illuminating the magnetic compass when the latter is used in the dark.

SUMMARY OF THE INVENTION

The object of the present invention is to provide an illuminating device which can be mounted on a bottom of a magnetic compass for illuminating the latter, and which permits convenient replacement of a battery thereof.

According to this invention, an illuminating device includes a mounting plate, a lighting device and a cover plate. The mounting plate has upper and lower surface walls which extend in a first direction and which are spaced apart from each other in a second direction transverse to the first direction. A central axial hole passes through the upper and lower surface walls to define a central axis parallel to the second direction. A battery receiving chamber is provided in the lower surface wall, and has an access aperture that opens downwardly and first and second exposing openings that are spaced apart from each other to communicate the battery receiving chamber with the upper surface wall. A battery is disposed in the battery receiving chamber, and has first and second poles which are exposed to the upper surface wall via the first and second exposing openings, respectively. The lighting device includes a lighting member which is disposed on the upper surface wall, and which has a first lead electrically connected to the first pole, and a second lead. A switching device has first and second conductive members. The first conductive member is connected to the second lead of the lighting member at an end thereof, and extends above the central axial hole at an opposite end thereof. The second conductive member is connected to the second pole of the battery at an end thereof, and is spaced apart from the first conductive member along the central axis at an opposite end thereof. The cover plate is disposed on the lower surface wall for closing the access aperture of the battery receiving chamber, and is rotatable relative to the mounting plate about the central axis between a locked position, where the cover plate is locked to the mounting plate from rotation relative to the central axis, and an unlocked position, where the cover plate is removable from the mounting plate. The cover plate has a central through hole aligned with the central axial hole along the central axis. An elastomeric activating member is disposed in the central through hole, and has an actuating portion to be depressed manually and a depression portion extending from the actuating portion upwardly through the central axial hole to activate electric contact between the first and second conductive members of the switching device so as to energize the lighting member with the battery when the actuating portion is depressed.

BRIEF DESCRIPTION OF THE DRAWINGS

Other features and advantages of the present invention will become apparent in the following detailed description of the preferred embodiment of the invention, with reference to the accompanying drawings, in which.

DETAILED DESCRIPTION OF THE PREFERRED EMBODIMENT

Figure 1:
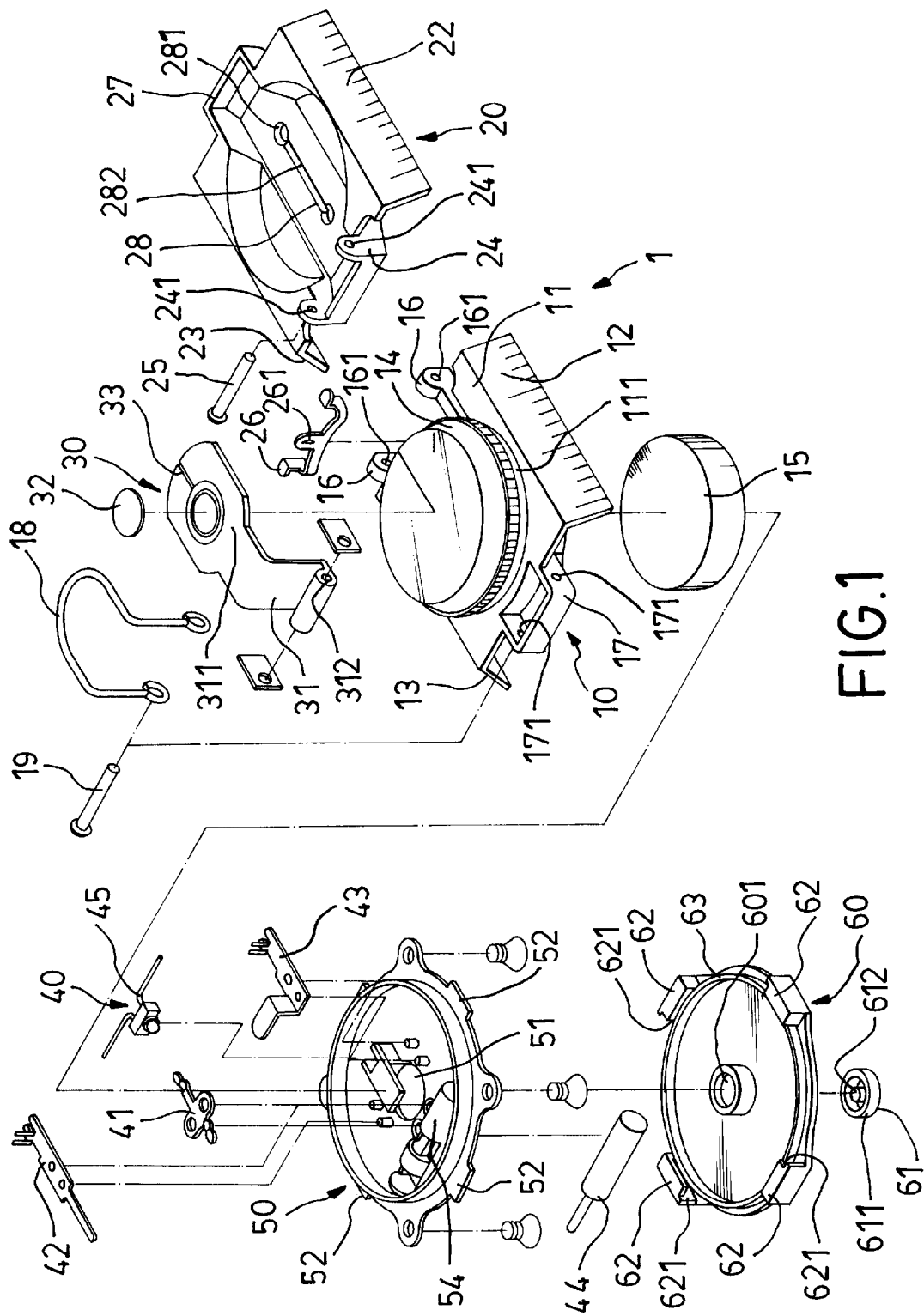
FIG. 1 is an exploded perspective view of a preferred embodiment of an illuminating device according to this invention and a magnetic compass.
Figure 2:
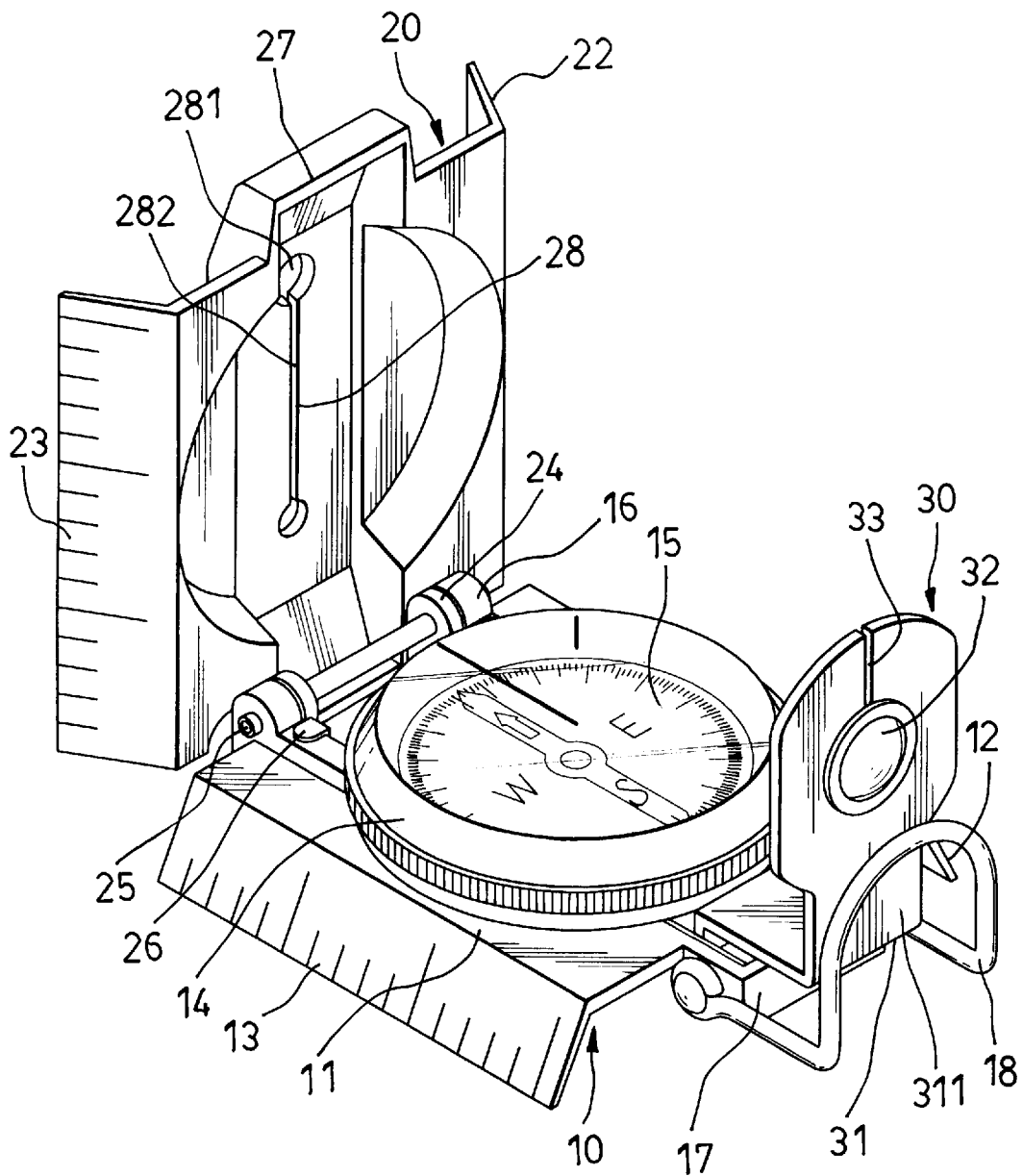
FIG. 2 is a perspective view of the preferred embodiment assembled on the magnetic compass shown in FIG. 1.

Referring to FIGS. 1 and 2, the preferred embodiment of the illuminating device according to the present invention is shown to be mounted on a magnetic compass 1. The compass 1 includes a base seat 10, a lid 20, and an aiming plate 30. The base seat 10 has a supporting portion 11 and two sets of length measuring marks 12, 13 which are formed on two opposite edge portions of the supporting portion 11. A ring portion 111 extends upwardly from the supporting portion 11 for providing a transparent plastic bezel 14 thereon. A compass case 15 with a compass rose and a compass needle therein is mounted between the supporting portion 11 and the bezel 14. Two opposite pivot lugs 16 are disposed on a front edge portion of the supporting portion 11 and have pivot holes 161, respectively. A pivot seat 17 is disposed on a rear edge portion of the supporting portion 11, and has two opposite pivot holes 171. Each of the lid 20 and the aiming plate 30 has a pivot end portion 24, 31 with pivot holes 241, 312 such that pivot pins 25, 19 pass through the pivot holes 241, 161 and 312, 171 so as to pivot the lid 20 and the aiming plate 30 on the base seat 10. A positioning member 18 is pivoted to the pivot seat 17 by the pivot pin 19 so as to position the aiming plate 30 in an upright position.

The lid 20 has a distal end portion 27 opposite to the pivot end portion 24. A sighting device 28 is disposed between the pivot and distal end portions 24, 27, and has a circular sighting hole 281 which is formed adjacent to the distal end portion 27, and an elongate aiming slit 282 which extends vertically from the sighting hole 281 toward the pivot end portion 24. The lid 20 further has two sets of length measuring marks 22, 23 formed on two opposite sides thereof. In addition, a positioning plate 26 is disposed between the pivot end portion 24 and the pivot lugs 16, and has a positioning portion 261 which can extend to retain the bezel 14 in position.

The aiming plate 30 has a distal end portion 311 perpendicular to the pivot end portion 31. The distal end portion 311 is formed with a notch 33 and has a magnifying glass 32 provided near the notch 33. In use, the lid 20 and the aiming plate 30 are rotated to extend perpendicular to the base seat 10, as shown in FIG. 2.

Figure 3:
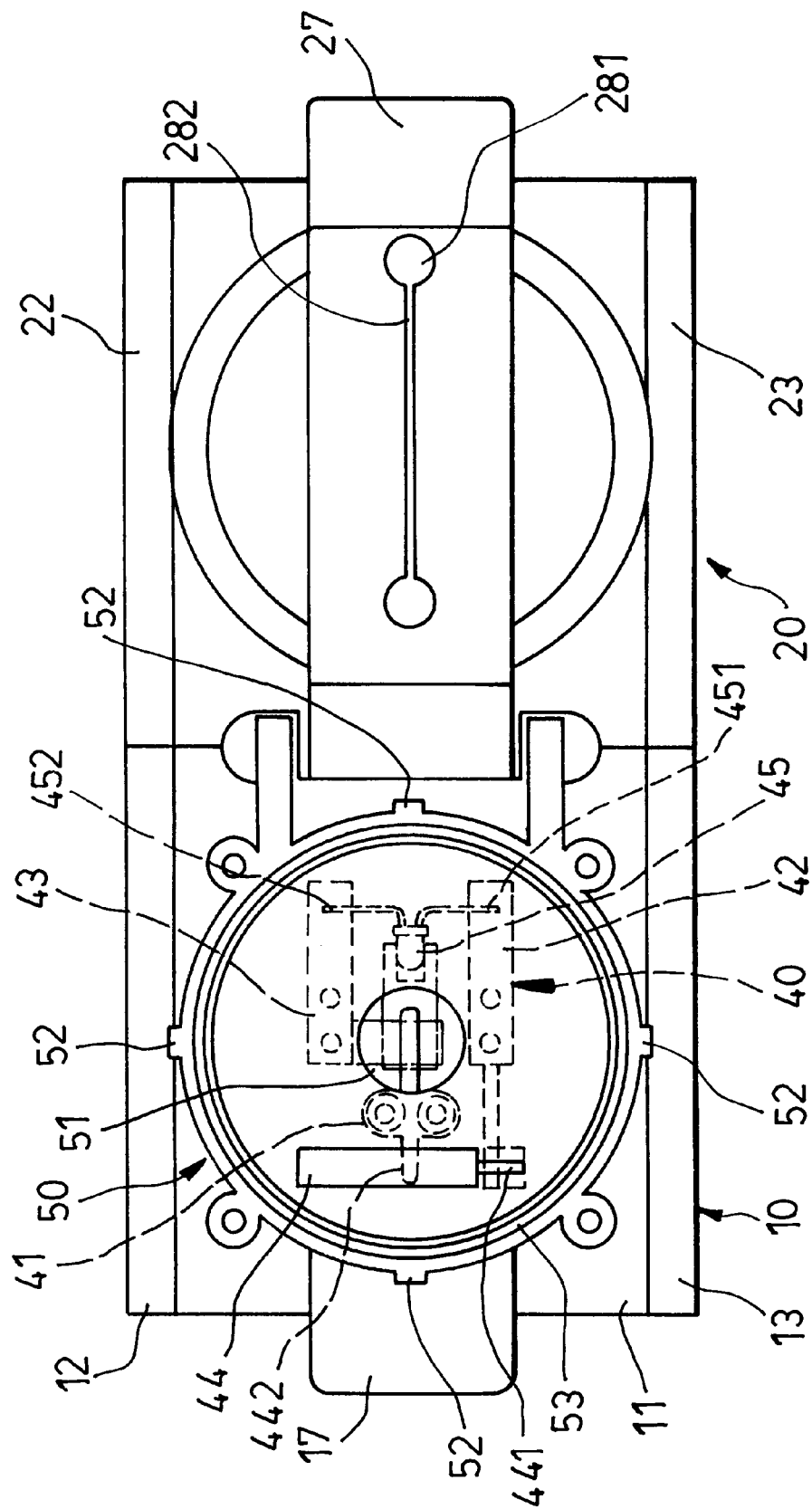
FIG. 3 is a schematic bottom view showing the illuminating device mounted on the bottom of the magnetic compass.
Figure 4:
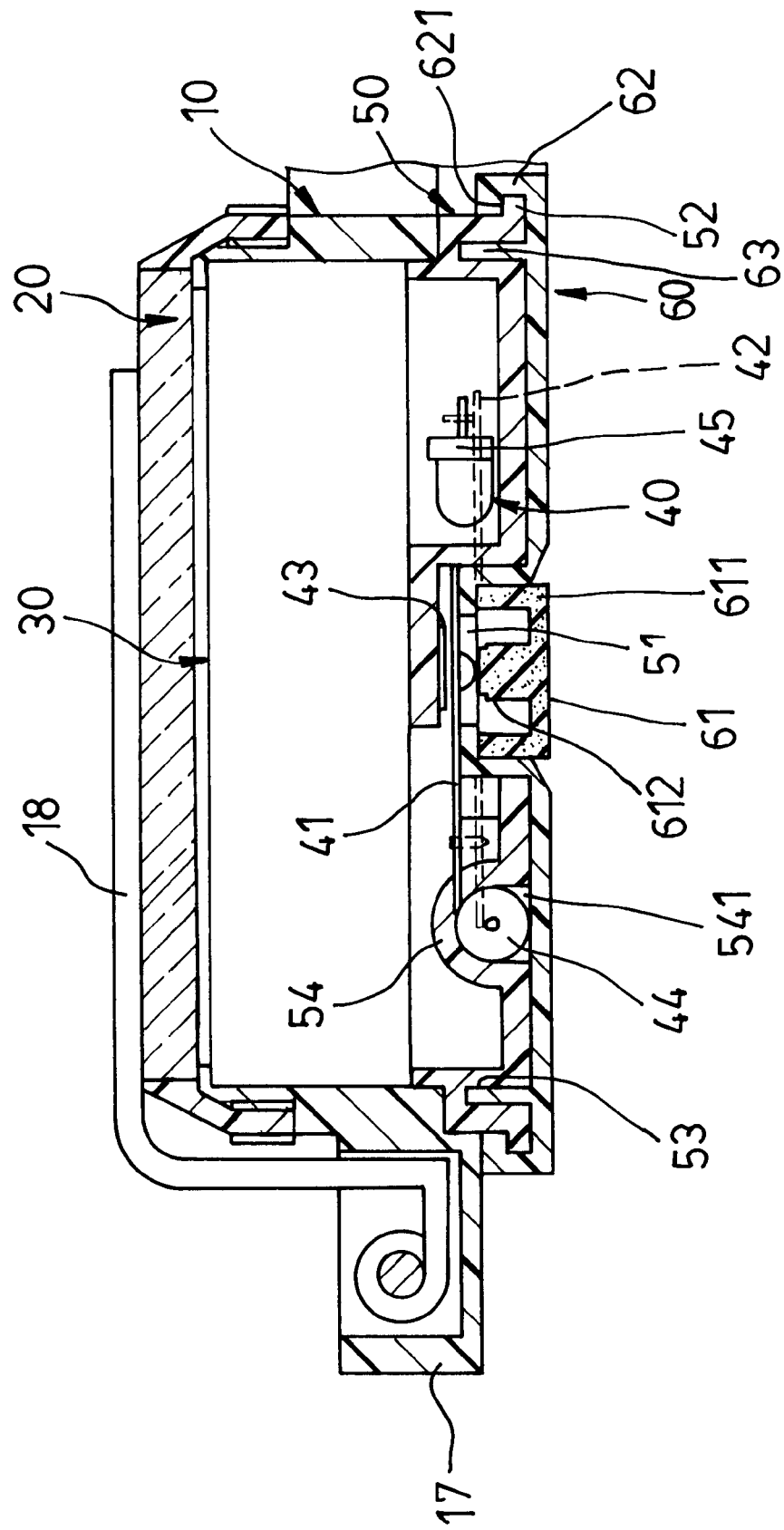
FIG. 4 is a sectional view of the illuminating device mounted on the magnetic compass.
Figure 5:
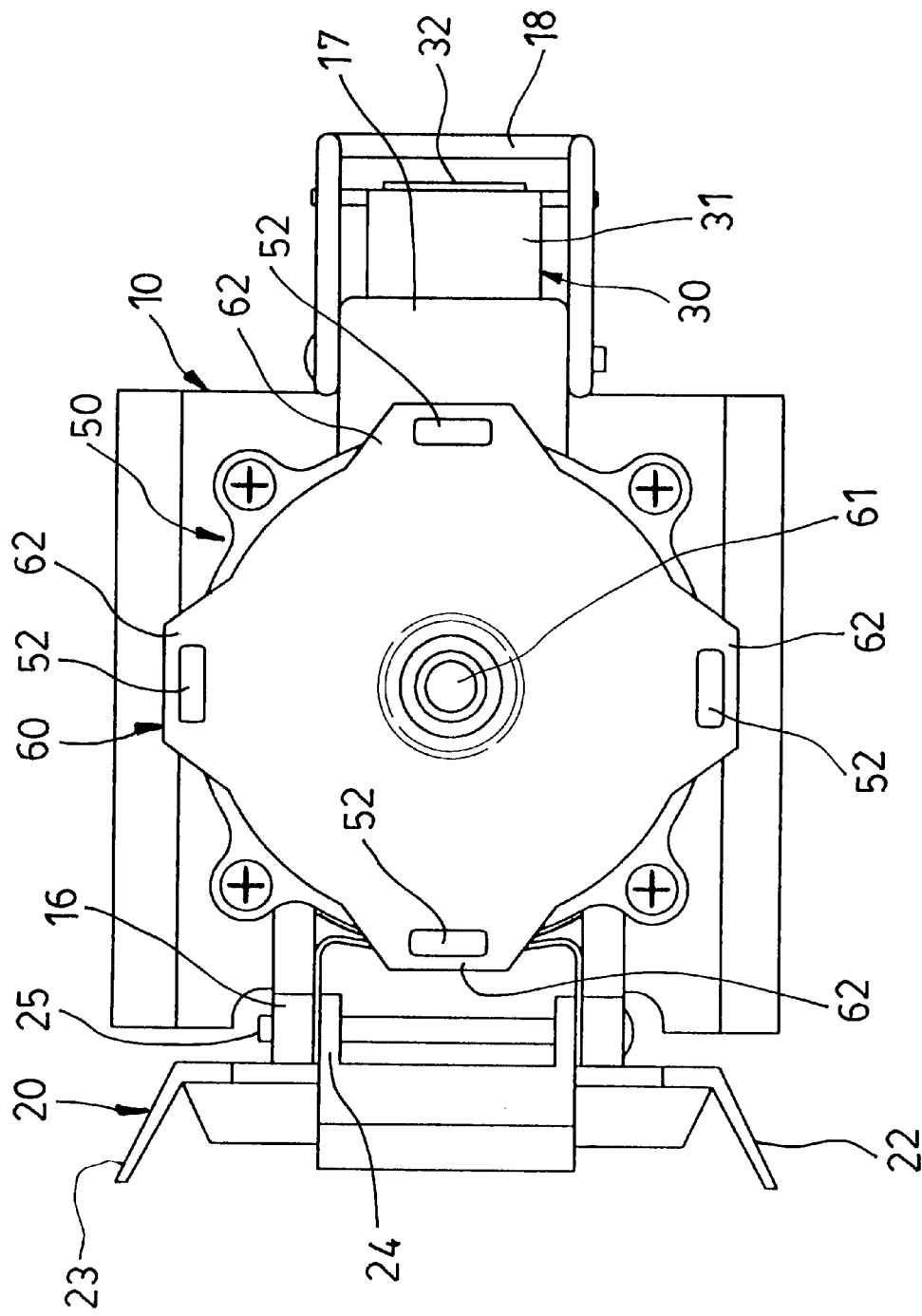
FIG. 5 is a schematic bottom view showing a cover plate of the illuminating device when locked on a mounting plate.

With reference to FIGS. 3 and 4, the illuminating device of the preferred embodiment according to this invention is shown to comprise a mounting plate 50, a lighting device 40, and a cover plate 60.

The mounting plate 50 has an upper surface wall which extends in a first direction and which is secured on a transparent bottom of the compass case 15, a lower surface wall opposite to the upper surface wall in a second direction transverse to the first direction, a central axial hole 51 which passes from the upper surface wall through the lower surface wall to define a central axis parallel to the second direction, and a battery receiving chamber 54 which is provided in of the lower surface wall. The battery receiving chamber 54 has an access aperture 541 which opens downwardly and towards the second direction, and first and second exposing openings (not shown) which are spaced apart from each other and which respectively communicate the battery receiving chamber 54 with the upper surface wall. A plurality of engaging tabs 52 extend radially and outwardly from a periphery of the mounting plate 50 in the first direction, and are angularly spaced apart from one another about the central axis.

The lighting device 40 includes a battery 44, a lighting member 45, and a switching device.

The battery 44 is disposed in the battery receiving chamber 54 and has first and second poles 441, 442 which are exposed to the upper surface wall of the mounting plate 50 via the first and second exposing openings, respectively.

A lighting member 45, such as a light emitting diode, is disposed on the upper surface wall, and has a first lead 451 which is electrically connected to the first pole 441 of the battery 44 by a conductive plate 42 in the first exposing opening, and a second lead 452.

The switching device has first and second conductive members 43, 41. The first conductive member 43 is connected to the second lead 452 of the lighting member 45 at an end thereof, and extends above the central axial hole 51 of the mounting plate 50 at an opposite end thereof. The second conductive member 41 is connected to the second pole 442 of the battery 44 at an end thereof and is spaced apart from the first conductive member 43 along the central axis at an opposite end thereof, as shown in FIG. 4.

The cover plate 60 is disposed on the lower surface wall of the mounting plate 50 for closing the access aperture 541 of the battery receiving chamber 54, and is rotatable relative to the mounting plate 50 about the central axis. The cover plate 60 has a central through hole 601 which is aligned with the central axial hole 51 along the central axis for passage of an elastomeric activating member 61. The activating member 61 has an actuating portion 611 which is received in the central through hole 601, and a depression portion 612 which extends upwardly from the actuating portion 611 through the central axial hole 51. A plurality of engaging members 62 are disposed on a periphery of the cover plate 60 about the central axis. Each engaging member 62 has a retaining groove 621 formed therein. The retaining groove 621 is in form of a dovetail. That is, the retaining groove 621 has a lead end and a tail end opposite to the lead end in a clockwise direction, and converges from the lead end toward the tail end. As such, the cover plate 60 can be rotated relative to the mounting plate 50 between a locked position, where each engaging tab 52 is inserted in the respective retaining groove 621 from the lead end toward the tail end so as to be retained in the retaining groove 621, thereby locking the cover plate 60 to the mounting plate 50 from rotation relative to the central axis, and an unlocked position, where the cover plate 60 is removable from the mounting plate 50.

In addition, an annular guiding groove 53 is formed in the lower surface wall of the mounting plate 50, and extends about the central axis. An annular guiding ring 63 is formed on the cover plate 60 and extends about the central axis so as to engage the guiding groove 53 to serve as a guiding member for guiding rotation of the cover plate 60 relative to the mounting plate 50.

In use, the actuating portion 611 of the activating member 61 is depressed manually and upwardly to activate electric contact between the first and second conductive members 43, 41 of the switching device in the second direction so as to energize the lighting member 45 with the battery 44.

When the cover plate 60 is rotated to move the engaging tabs 52 respectively away from the retaining grooves 621, the battery 44 can be removed from the battery receiving chamber 54. Thus, replacement of the battery 44 is convenient to conduct.

While the present invention has been described in connection with what is considered the most practical and preferred embodiment, it is understood that this invention is not limited to the disclosed embodiment but is intended to cover various arrangements included within the spirit and scope of the broadest interpretations and equivalent arrangements.

I claim:

1. An illuminating device adapted to be mounted on a transparent bottom of a magnetic compass for illuminating a compass needle and a compass rose, said illuminating device comprising:

a mounting plate having an upper surface wall extending in a first direction and adapted to be secured on the bottom of the magnetic compass, a lower surface wall opposite to said upper surface wall in a second direction transverse to said first direction, a central axial hole passing from said upper surface wall through said lower surface wall to define a central axis parallel to said second direction, and a battery receiving chamber provided in said lower surface wall, and having an access aperture that opens downwardly and towards said second direction and first and second exposing openings that are spaced apart from each other and that respectively communicate said battery receiving chamber with said upper surface wall;

a battery disposed in said battery receiving chamber and having first and second poles exposed to said upper surface wall via said first and second exposing openings, respectively;

a lighting member disposed on said upper surface wall, and having a first lead electrically connected to said first pole via said first exposing opening, and a second lead;

a switching device having a first conductive member connected to said second lead of said lighting member at an end thereof and extending above said central axial hole at an opposite end thereof, and a second conductive member connected to said second pole of said battery at an end thereof and spaced apart from said first conductive member along said central axis at an opposite end thereof;

a cover plate disposed on said lower surface wall of said mounting plate for closing said access aperture of said battery receiving chamber, and rotatable relative to said mounting plate about said central axis between a locked position where said cover plate is locked to said mounting plate from rotation relative to said central axis, and an unlocked position where said cover plate is removable from said mounting plate, said cover plate having a central through hole aligned with said central axial hole along said central axis;

means for locking and unlocking said mounting plate relative to said cover plate when said cover plate is in said locked and unlocked positions, respectively; and an elastomeric activating member disposed in said central through hole and having an actuating portion to be depressed manually and a depression portion extending from said actuating portion upwardly through said central axial hole to activate electric contact between said first and second conductive members of said switching device in said second direction so as to energize said lighting member with said battery when said actuating portion is depressed.

2. The illuminating device as claimed in claim 1, wherein said locking and unlocking means includes a plurality of engaging tabs extending radially and outwardly from a periphery of said mounting plate in said first direction and angularly spaced apart from one another about said central axis, and a plurality of engaging members disposed on a periphery of said cover plate about said central axis and each having a retaining groove formed therein such that a respective one of said engaging tabs is retained in said retaining groove when said cover plate is brought to rotate relative to said mounting plate to said locked position.

3. The illuminating device as claimed in claim 2, wherein said retaining groove has a lead end and a tail end opposite to said lead end in a clockwise direction, and converges from said lead end toward said tail end so as to retain a respective one of said engaging tabs in said retaining groove.

4. The illuminating device as claimed in claim 3, further comprising an annular guiding member disposed between said lower surface wall of said mounting plate and said cover plate, and extending about said central axis for guiding rotation of said cover plate relative to said mounting plate.

5. The illuminating device as claimed in claim 1, wherein said lighting member is a light emitting diode.

* * * * *